(12) United States Patent
Eiselt et al.

(10) Patent No.: US 9,369,227 B2
(45) Date of Patent: Jun. 14, 2016

(54) PROTECTED OPTICAL SINGLE-FIBER WDM SYSTEM

(71) Applicant: ADVA Optical Networking SE, Meiningen (DE)

(72) Inventors: Michael Eiselt, Kirchheim (DE); Klaus Grobe, Planegg (DE); Jörg-Peter Elbers, Fürstenfeldbruck (DE)

(73) Assignee: ADVA Optical Networking SE, Meiningen (DE)

( * ) Notice: Subject to any disclaimer, the term of this patent is extended or adjusted under 35 U.S.C. 154(b) by 72 days.

(21) Appl. No.: 14/180,295

(22) Filed: Feb. 13, 2014

(65) Prior Publication Data

US 2014/0226987 A1   Aug. 14, 2014

(30) Foreign Application Priority Data

Feb. 14, 2013   (EP) .................................... 13000761

(51) Int. Cl.
*H04J 14/02*   (2006.01)

(52) U.S. Cl.
CPC ......... *H04J 14/0216* (2013.01); *H04J 14/0213* (2013.01); *H04J 14/0283* (2013.01); *H04J 14/0294* (2013.01); *H04J 14/0297* (2013.01); *H04J 14/0279* (2013.01); *H04J 14/0295* (2013.01)

(58) Field of Classification Search
CPC .............. H04J 14/0213; H04J 14/0216; H04J 14/0279; H04J 14/0283; H04J 14/0294; H04J 14/0295; H04J 14/0201; H04J 14/021

USPC .......................... 398/85, 59, 57, 68, 34, 82, 83
See application file for complete search history.

(56) References Cited

U.S. PATENT DOCUMENTS

| | | | |
|---|---|---|---|
| 6,327,400 B1 | 12/2001 | Harstead et al. | |
| 2005/0084262 A1* | 4/2005 | Oberg | H04B 10/032 398/19 |
| 2010/0054751 A1 | 3/2010 | Murry et al. | |
| 2011/0164882 A1* | 7/2011 | Ye | H04B 10/077 398/141 |

FOREIGN PATENT DOCUMENTS

| | | |
|---|---|---|
| EP | 1746857 A1 | 1/2007 |
| EP | 2597801 A1 | 5/2013 |
| WO | 02084915 A1 | 10/2002 |

\* cited by examiner

*Primary Examiner* — David Payne
*Assistant Examiner* — Omar S Ismail

(57) ABSTRACT

A first and second head-end terminal and at least one optical add/drop filter device are connected to form a transmission path. Each head-end terminal is connected through an optical fiber to a western or eastern WDM port of an adjacent optical add/drop filter device, and each optical add/drop filter device is connected, at an eastern or western WDM port, to a western or eastern WDM port of an adjacent optical add/drop filter device. At least one tail-end terminal is connected to each optical add/drop filter device, wherein a first and second channel port of the respective add/drop tail-end terminal is connected to a dedicated first and second channel port of the optical add/drop filter device through a respective optical fiber. The head-end terminals, the optical add/drop filter devices, and the tail-end terminals are adapted to establish bidirectional communication between each tail-end terminal and the first and second head-end terminal.

15 Claims, 11 Drawing Sheets

PROTECTED OPTICAL SINGLE-FIBER WDM SYSTEM

CROSS-REFERENCE TO RELATED APPLICATIONS

This application claims priority under 35 U.S.C 119 to European Application No. EP 20130000761.0, filed Feb. 14, 2013 by Eiselt, et al. and entitled "A protected optical single-fiber WDM system."

TECHNICAL FIELD OF THE INVENTION

The invention relates to a protected optical single-fiber WDM system that increases the system availability.

BACKGROUND

Low cost WDM systems usually operate on a single fiber transporting traffic in a bi-directional way. These systems support point-to-point connections, where one terminal is located in a central hub for all connections (head-end terminal), while the second terminals (tail end) of each point-to-point connection are locally distributed. The traffic in the head-end to tail-end direction is transported in a first wavelength band, e.g. the optical L-band, while the traffic in the opposite direction is transported in a second wavelength band, e.g. the optical C-band. This reduces signal deterioration due to backscattering or reflections which would be present if identical wavelength bands were used for both transmission directions. Currently, the architecture of such a system has a tree structure, in which all connections use dedicated channel signals forming a WDM signal in one or more trunk fibers and in which the individual channel signals at respective optical carrier wavelengths, i.e. optical channel wavelength bands, are split in a remote optical filter unit. For each point-to-point connection between the remote filter unit and the tail-end terminal only a single wavelength per direction is used per fiber. However, it is also possible to use double or multifold point-to-point connections between the head-end terminal and the same tail-end terminal or to use more than one optical channel signal for a single point-to-point connection between the head-end terminal and a tail-end terminal, if the bandwidth provided by a single optical channel signal is insufficient to transport the desired information.

For some applications it is required to protect the connections against fiber cuts and other external impacts in order to increase the system availability. Using the architecture described above, protection can only be guaranteed by doubling the fiber tree structure, leading to high costs. Protection of two-fiber optical transmission systems using one fiber uni-directionally for each transmission direction is usually achieved by using a fiber ring and transporting traffic in both directions over each fiber. In these systems, the head-end to tail-end traffic uses the same wavelength band as traffic in the other direction. However, using two optical fibers in order to achieve protection increases the costs for realizing such structures.

Further, a protected optical single-fiber transmission system is, for example, disclosed in U.S. Pat. No. 6,327,400 B1. This system uses a ring structure to assure the protection. The tail-end terminals are coupled to the single-fiber ring by means of two 1×2 couplers which enable a communication in both directions of the ring. Here, an optical signal in the form of a TDM signal is used so that an optical signal (the TDM signal transported by a single optical carrier signal) is used for both communication directions. Thus, the bandwidth must be shared by all the tail-end terminals, so this structure is not appropriate for applications that require an increased bandwidth for the communication between each tail-end terminal and the head-end terminal.

SUMMARY OF THE INVENTION

It is an object of the present invention to provide a protected optical single-fiber WDM system in which protection can be achieved with less effort.

The invention provides, instead of using a closed ring structure or a bus structure, an open ring structure with two head-end terminals provided at each end of the chain-like structure in which further at least one add/drop filter device lies between the two head-end terminals adapted to connect at least one tail-end terminal. The head-end terminals and the add/drop filter devices are connected via a single optical fiber or fiber sections, respectively. The head-end terminals, the optical add/drop filter devices and the tail-end terminals are adapted to selectively or simultaneously establish a bidirectional communication between each tail-end terminal and the first and second head-end terminal, wherein each tail-end terminal bidirectionally communicates through a first channel port with the first head-end terminal and bidirectionally communicates through a second channel port with the second head-end terminal, one of these communication paths serving as a working communication path and the other of these communication paths serving as a protection path. According to the invention, for the communication between each of the tail-end terminals and the first and second head-end terminal, respectively, dedicated optical channel signals lying in a first wavelength band and a second wavelength band are used for each transmission direction, the first and second wavelength band revealing no overlap and the optical channel signals in each wavelength band forming, in each transmission direction in the chain-like transmission path, respective optical WDM signals.

Thus, if the chain-like transmission path between a tail-end terminal and one of the head-end terminals is interrupted, e.g. due to a failure of the respective head-end terminal, an interruption of the chain-like transmission path (including a failure within the add/drop filter devices) or an interruption of the optical path between the respective tail-end terminal and the dedicated add/drop filter device, it is possible to establish a protection path between the respective tail-end terminal and the respective other head-end terminal that can be reached by using the uninterrupted part of the chain-like transmission path.

Of course, the communication can easily be established if an open ring structure is used as the head-end terminals are located at the same location or are even realized by the same hardware. If a chain-like transmission path in the form of a dual-ended transmission line is used, it must be possible to transport the information from the respective other head-end terminal which is used for communicating over the protection path to the (location of the) respective other head-end terminal. This can be done by using another communication path provided by an already existing communication network.

The system according to an embodiment of the invention provides protection against fiber cuts using only a single fiber connection between all network nodes (i.e. between the head-end terminals and the add/drop filter devices) and thus requires minimum effort.

The two head-end terminals terminate the traffic of all channels (i.e. all optical channel signals) on the head-end side(s). This provides protection against equipment failure. Traffic from the head end to the tail end is transported in one wavelength band, while the traffic from the tail end to the head end is transported in a second wavelength band.

According to a preferred embodiment of the invention, the system is set up using true passive optical add/drop filter devices. This reduces the costs of the components as well as the costs of installing and maintaining the system.

Each of the optical add/drop filter devices included within the chain-like transmission path is adapted to drop from the respective optical WDM signal received at the western WDM port, at the respective first channel port, the optical channel signal dedicated to the respective tail-end terminal and to add the optical channel signal received from the first channel port of the respective tail-end terminal to the optical WDM signal that is transmitted to the first head-end terminal via the western WDM port, and to drop from the respective optical WDM signal received at the eastern WDM port, at the respective second channel port, the optical channel signal dedicated to the respective tail-end terminal and to add the optical channel signal received from the second channel port of the respective tail-end terminal to the optical WDM signal that is transmitted to the second head-end terminal via the eastern WDM port.

Preferably, the optical add/drop filter devices are designed such that the optical channel signals dropped at the respective optical add/drop filter device are extracted from the respective optical WDM signal received and are no longer transmitted further in the chain-like transmission path. As one or more specific optical channel signals of the first band and the second band are dedicated to each of the add/drop filter devices (representing a network node), only complementary optical WDM signals are present in the optical paths (i.e. especially the optical fiber paths) between the head-end terminals and the add/drop filter devices and between neighboring add/drop devices. That is, the optical WDM signal transmitted in one direction and the WDM signal transmitted in the opposite direction do not include any optical channel signal having the same wavelength.

Thus, signal distortion due to signal reflection or backscattering in the chain-like transmission path is significantly reduced and no specific measures are necessary to reduce reflection and/or backscattering effects, which additionally reduces costs.

According to further embodiments, at least one of the optical add/drop filter devices includes an optical add/drop filter unit adapted as follows:

- to output, at a first add/drop port, all optical channel signals to be dropped at the respective optical add/drop filter device from the optical WDM signal received at the western WDM port,
- to receive, at the first add/drop port, an optical WDM signal comprising all optical channel signals received from the at least two tail-end terminals and to integrate these optical channel signals into the optical WDM signal output at the western WDM port,
- to output, at a second add/drop port, all optical channel signals to be dropped at the respective optical add/drop filter device from the optical WDM signal received at the eastern WDM port, and
- to receive, at the second add/drop port, an optical WDM signal comprising all optical channel signals received from the at least two tail-end terminals and to integrate these optical channel signals into the optical WDM signal output at the eastern WDM port.

The optical add/drop filter unit may be adapted to be connected to a single tail-end terminal, the first and second add/drop ports of the optical add/drop filter unit defining the first and second channel ports of the optical add/drop filter device.

The tail-end terminal connected to a respective add/drop node may, of course, be provided at a different location.

The optical add/drop filter unit may be adapted to add a single optical channel signal to the optical WDM signals output at the western and eastern WDM port, respectively, and to drop a single optical channel signal from the optical WDM signal received at the western and eastern WDM port, respectively. However, also a set of optical channel signals per direction may be used for the communication between the respective individual tail-end terminal and the respective head-end terminal.

According to another embodiment, the optical add/drop filter device is adapted to be connected to at least two tail-end terminals and includes a first and a second optical multiplexer/demultiplexer device. In this embodiment, the first optical multiplexer/demultiplexer device is connected with a WDM port to the first add/drop port of the optical add/drop filter unit. The first optical multiplexer/demultiplexer device has channel ports defining the first channel ports of the optical add/drop filter device, and is adapted to demultiplex the optical WDM signal received at its WDM port into the optical channel signals and to output these optical channel signals at the dedicated first channel ports and to multiplex the optical channel signals received at the first channel ports into the optical WDM signal output at its WDM port. The second optical multiplexer/demultiplexer device is connected with a WDM port to the second add/drop port of the optical add/drop filter unit. The second optical multiplexer/demultiplexer device has channel ports defining the second channel ports of the optical add/drop filter device, and is adapted to demultiplex the optical WDM signal received at its WDM port into the optical channel signals and to output the optical channel signals at the dedicated second channel ports and to multiplex the optical channel signals received at the second channel ports into the optical WDM signal output at its WDM port.

In this embodiment, the optical add/drop filter unit and the first and second optical multiplexer/demultiplexer devices may be provided at different locations, the first and second add/drop ports of the add/drop filter unit preferably being connected to the respective WDM port of the respective first and second optical multiplexer/demultiplexer device through an optical fiber.

According to another embodiment, an optical add/drop filter unit for realizing an optical add/drop filter device includes a first add/drop filter module having a western and an eastern WDM port, the western WDM port defining the western WDM port of the optical add/drop filter device and the eastern WDM port defining an eastern pass-through port, and an add/drop port defining the first add/drop port of the optical add/drop filter unit. The optical add/drop filter unit further includes a second add/drop filter module having a western and an eastern WDM port, the eastern WDM port defining the eastern WDM port of the optical add/drop filter device and the western WDM port defining a western pass-through port, and an add/drop port defining the second add/drop port of the optical add/drop filter unit. The first and second add/drop filter modules are connected at the eastern and western pass-through ports.

These first and second add/drop filter modules may be provided at different locations, the pass-through ports being connected through an optical fiber. In this way, a distributed add/drop node can be realized, which increases the flexibility of the system.

These optical add/drop filter modules may include a first and a second optical filter element provided in series within the optical path of the optical WDM signals between the western or eastern WDM port and the eastern or western pass-through ports of the respective optical add/drop filter module. In this embodiment, the first optical filter element is adapted to reflect all optical channel signals to be dropped at the respective optical add/drop filter device and included in the optical WDM signal received at the western or eastern WDM port of the respective optical add/drop filter module and to pass through all other optical channel signals. The optical channel signals reflected by the first optical filter element are directed in a respective direction to the first or second add/drop port defined by the respective optical add/drop filter module. The second optical filter element is adapted to receive, via the first or second add/drop port defined by the respective optical add/drop filter module, all optical channel signals to be added at the respective add/drop module and to reflect these optical channel signals such that they are integrated into the WDM signal output at the western or eastern WDM port defined by the respective add/drop filter module and to pass through all other optical channel signals.

To simplify the construction, the first and second optical filter elements may be realized by a single optical filter element which is adapted to reflect both the optical channel signals to be dropped and the optical channel signals to be added and to pass through all other channel signals.

In another embodiment, an optical add/drop filter unit includes a first and a second optical filter element provided in series within the optical path of the optical WDM signals between the western and eastern WDM port. The first optical filter element is adapted to reflect all optical channel signals to be dropped at the respective optical add/drop filter device and included in the optical WDM signals received at the western and eastern WDM ports of the optical add/drop filter unit and to pass through all other optical channel signals. The first optical filter element is further adapted and arranged to direct the reflected optical channel signals received from the western WDM port in a direction to the first add/drop port and to direct the reflected optical channel signals received from the eastern WDM port in a direction to the second add/drop port. The second optical filter element is adapted to reflect all optical channel signals to be added at the respective optical add/drop filter device via the first and second add/drop port of the optical add/drop filter unit and to pass through all other optical channel signals. The second optical filter element is further adapted and arranged to direct the reflected optical channel signals received via the first add/drop port to the western WDM port and to direct the reflected optical channel signals received via the second add/drop port to the eastern WDM port.

Also in this embodiment, the first and second optical filter elements may be realized by a single optical filter element which is adapted to reflect both the optical channel signals to be dropped and the optical channel signals to be added and to pass through all other channel signals. As in the embodiment explained above, the single optical filter element may be realized as cyclic optical filter.

In all the above-explained embodiments using reflective optical filter elements in a design for an optical add/drop filter unit or an optical add/drop filter module, respectively, an optical diplexer may be provided, having a WDM port defining the first or second add/drop port adapted to output all the optical channel signals to be dropped and to receive all the optical channel signals to be added at the respective optical add/drop filter unit, the optical diplexer having further a first band port adapted to receive the optical channel signals reflected in the direction of the first add/drop port and a second band port adapted to output the optical channel signals to be reflected and integrated into the respective WDM signal.

In this way, a simple design of the optical add/drop filter unit or an optical add/drop filter module can be achieved.

According to the invention, the first and second head-end terminal and the at least one tail-end terminal may be adapted to simultaneously transmit the respective optical channel signals for establishing a bidirectional communication between the first and second head-end terminal and the at least one tail-end terminal via the communication path and the protection path and to select one of the respective channel signals received via either the working path or the protection path for communicating with each other. If both signals are present at the head-end terminal or the respective tail-end terminal, the signal selection can be made, for example, by evaluating the signal quality.

In another embodiment, the first and second head-end terminal and the at least one tail-end terminal are adapted to selectively transmit the respective optical channel signals for establishing a bidirectional communication between the first and second head-end terminal and the at least one tail-end terminal either via the communication path or via the protection path and switch to transmitting the respective optical signals via the respective other path if a loss of signal or an inadmissible deterioration of a parameter depending on or characterizing the signal quality is detected.

Other embodiments of the invention are apparent from the dependent claims.

BRIEF DESCRIPTION OF THE DRAWINGS

In the following, the invention is explained in greater detail with respect to various example embodiments shown in the drawings.

DETAILED DESCRIPTION OF EXAMPLE EMBODIMENTS

Figure 1:
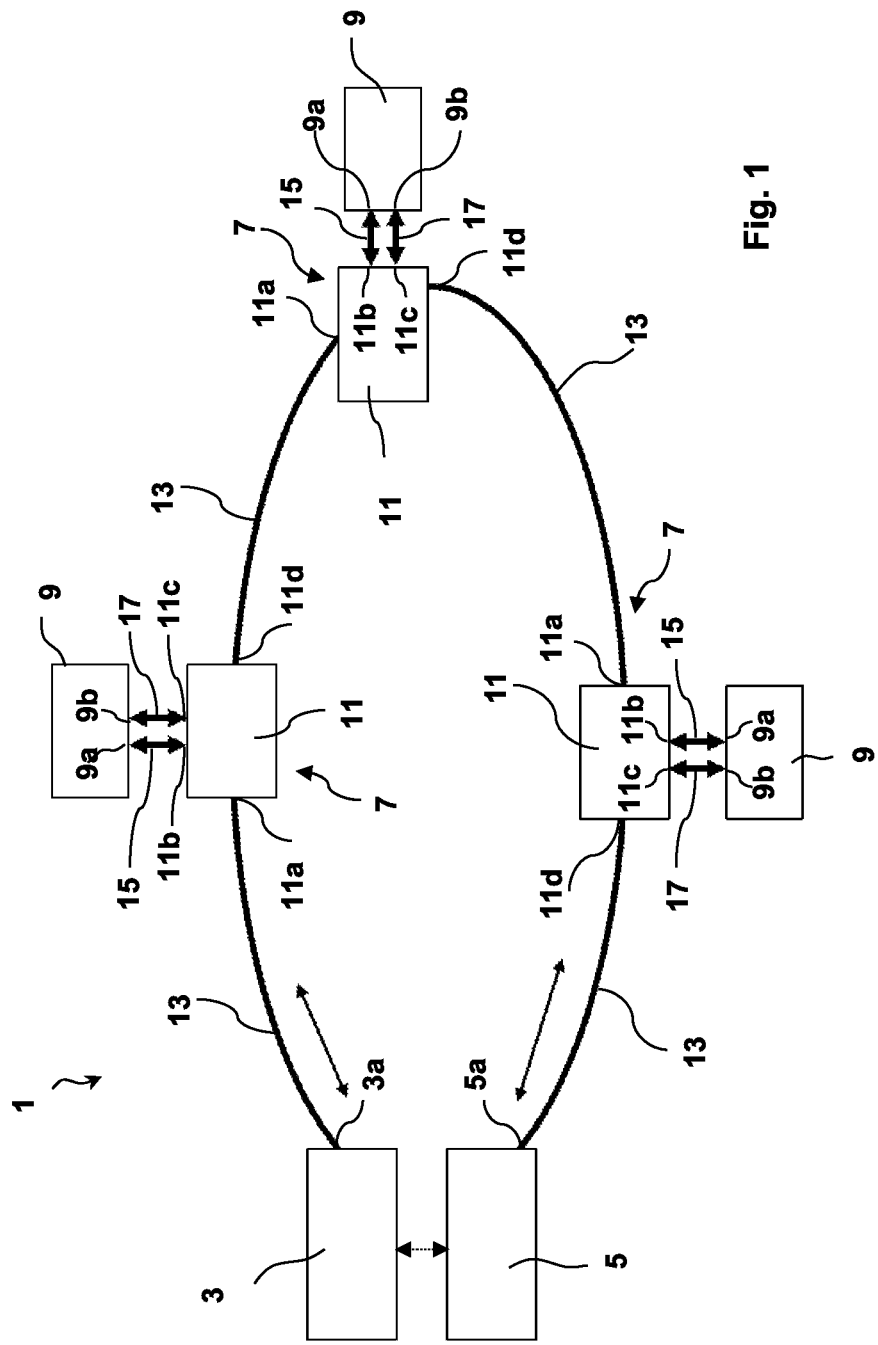
FIG. 1 shows a schematic block diagram of an optical single-fiber WDM system providing point-to-point transmission links between tail-end terminals and a first or second head-end terminal, respectively, the system having a chain-like optical transmission path with the two head-end terminals being provided at the same location.

FIG. 1 shows a schematic block diagram of an optical single-fiber WDM system 1 comprising a first and second head-end terminal 3, 5, and three network nodes 7 adapted to connect at least one tail-end terminal 9. The head-end terminals 3, 5 and the network nodes 7 are connected in a chain-like manner by a single optical waveguide, preferably by a single optical fiber 13. In this description, the term "optical fiber" is used in a general manner comprising any type of an optical waveguide. Of course, a separate optical fiber 13 can be used between each of the head-end terminals 3, 5 and each network node 7. Each network node 7 comprises an optical add/drop filter device 11 adapted to connect the at least one tail-end terminal 9, wherein each of the tail-end terminals 9 is connected through a first and a second channel port 9a, 9b and a first and a second optical channel path 15, 17 to dedicated channel ports 11a, 11b of the optical add/drop filter device 11 of the respective network node 7. The two head-end terminals 3, 5 are provided at the same location, so that a communication between the two head-end terminals may be established without additional effort. They may even be realized by the same apparatus or hardware.

The head-end terminals 3, 5 and the tail-end terminals 9 are adapted to establish bidirectional point-to-point transmission links between each of the tail-end terminals and the first or second head-end terminal 3, 5, respectively, i.e. between each of western WDM ports 11a of the tail-end terminals 9 and a WDM port 3a of the first head-end terminal 3 and between each of eastern WDM ports of the tail-end terminals 9 and a WDM port 5a of the second head-end terminal 5. The transmission links may be established simultaneously or alternatively. At any rate, one of the transmission links between the respective tail-end terminal 9 and the first head-end terminal and the respective tail-end terminal 9 and the second head-end terminal 5 serves as a working transmission link and the other transmission link serves as a protection transmission link. The working transmission link is used under normal operating conditions whereas the protection transmission link is used in case of an interruption or otherwise disturbed transmission over the working transmission link. As the two head-end terminals are provided at the same location and can even be realized by the same hardware, the information received from a tail-end terminal and to be transmitted to the respective tail-end terminal can easily be provided from or to both the first and second head-end terminal. The first optical channel path 15 is used for the bidirectional transmission between the respective tail-end terminal 9 and the first head-end terminal 3, and the second optical path 17 is used for the bidirectional transmission between the respective tail-end terminal 9 and the second head-end terminal 5. Thus, full protection of the optical paths between the respective tail-end terminal and the head-end side (i.e. the first or second head-end terminal 3, 5) is provided. Additionally, an equipment protection is achievable in case the head-end terminals 3, 5 comprise separate transceiver units and the tail-end terminals comprise separate transceiver units for each transmission direction (to the first or second head-end terminal, respectively).

The communication between the head-end terminals 3, 5 and each of the tail-end terminals 9 is established by using dedicated optical channels, each optical channel having a predetermined distinct optical (carrier) wavelength or frequency. For the transmission direction from the first or second head-end terminal 3, 5 to each of the tail-end terminals 9 at least one selected optical channel signal selected from a first set of predetermined optical channels lying in a first wavelength band, e.g. the L-band, is used, and for the transmission direction from each of the tail-end terminals to the first or second head-end terminal 3, 5 at least one selected optical channel signal selected from a second set of predetermined optical channels lying in a second wavelength band, e.g. the C-band, is used. The optical channels carry corresponding optical channel signals transporting the information transmitted to the respective tail-end or head-end terminal. The optical channel or channel signal or sets of optical channels or channel signals dedicated to each of the head-end terminals 9 form channel pairs or pairs of sets of channels used for establishing the bidirectional communication in both directions of the open ring structure, i.e. in the direction to and from the first and second head-end terminal 3, 5.

Each of the add/drop filter devices 11 is adapted to receive an optical WDM signal created by the first or second head-end terminal 3,5 and transmitted over the chain-like optical path at a western 11a or eastern 11d WDM port and to extract from the optical WDM signals received the optical channel signals of all the optical channels (lying in the first wavelength band) dedicated to the tail-end terminals connected to the respective add/drop filter device 11. The optical channel signals extracted from the WDM signal received at the western WDM port 11a are output at a first channel port 11b to the first optical channel path 15, and the optical channel signals extracted from the WDM signal received at the eastern WDM port 11d are output at a second channel port 11c to the second optical channel path 17. Preferably, the optical channel signals are fully extracted from the chain-like transmission path, so that the remaining WDM signal, which is output at the opposite eastern or western WDM port 11d, 11 a of the add/drop filter device 11, no longer comprises a channel signal of the respective optical channel and includes the remaining optical channel signals (of pass-through channels dedicated to tail-end terminals 9 connected to other optical add/drop filter devices 11), only.

Further, each of the add/drop filter devices 11 is adapted to receive the optical channel signals (of the dedicated optical channels lying in the second wavelength band) created by the tail-end terminals 9 connected to the respective add/drop filter device 11 at the respective first or second channel port and to add these channel signals to the respective WDM signal which is output at the respective western or eastern WDM port 11a, 11b. The optical channel signals received at the first channel port 11b are added to the WDM signal received at the eastern WDM port 11d from which the channel signals dedicated to the respective tail-end terminals have been extracted, and the completed WDM signal is output at the western WDM port. The optical channel signals received at the second channel port 11c are added to the WDM signal received at the western WDM port 11d from which the channel signals dedicated to the respective tail-end terminals have been extracted, and the completed WDM signal is output at the eastern WDM port.

In case the head-end terminals 3, 5 and the tail-end terminals 9 provide separate transceiver units for bidirectionally communicating via the respective working and protection path, the communication via both paths may be effected simultaneously. Which of the two signals received (which carry the identical information) is actually used for further processing may then be decided at the receiving end (i.e. at the head-end terminal or at the tail-end terminal) depending on the signal quality or other signal dependent parameters. Of course, if only one of the two signals is received via the two possible transmission paths, the remaining signal is used for further processing.

Alternatively, the communication via the two possible transmission paths may not be effected simultaneously but via a predetermined working path, only. If the transmission is interrupted or the signal quality is decreased in an unacceptable manner, the transmission is switched to the respective other path, i.e. the protection path.

Of course, in order to decide which one of two signals received simultaneously via both of the possible transmission paths shall be used for further processing or for switching from the working to the protection path and vice versa, a communication path between the first and second head-end terminal is necessary. This communication path also serves for supplying the information to be transmitted to the tail-end terminals and the information received from the tail-end terminals to the respective other head-end terminal. In FIG. 1, a respective (internal or external) communication path between the first and second head-end terminal 3, 5 is indicated by the dashed line.

Figure 2:
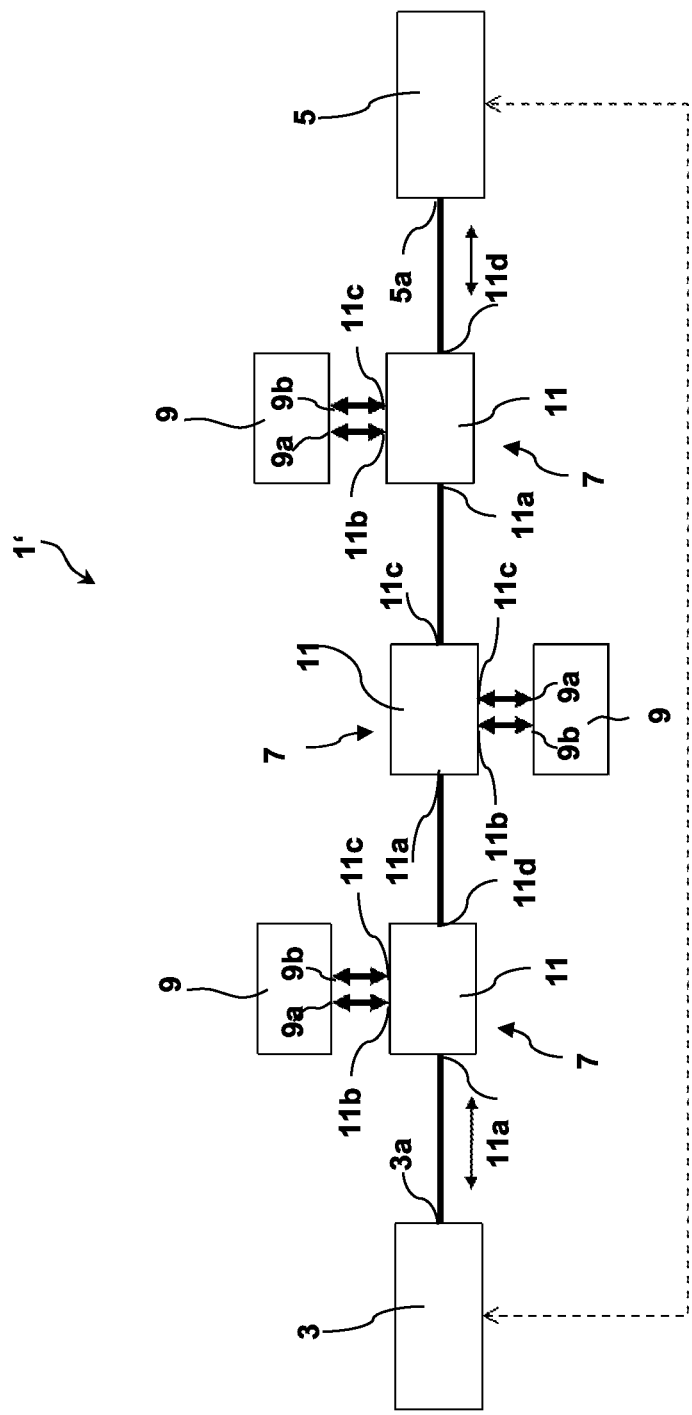
FIG. 2 shows a schematic block diagram of a further embodiment of an optical single-fiber WDM system similar to FIG. 1 having a chain-like optical transmission path with the two head-end terminals being provided at different locations.

FIG. 2 shows an optical single fiber WDM system 1' similar to the system 1 in FIG. 1. The WDM system 1', however, reveals a linear structure of the chain-like transmission path for the transport of the optical WDM signals. As the head-end terminals 3, 5 are provided at different locations, an external communication path (indicated by the dashed line) is necessary.

Figure 3:
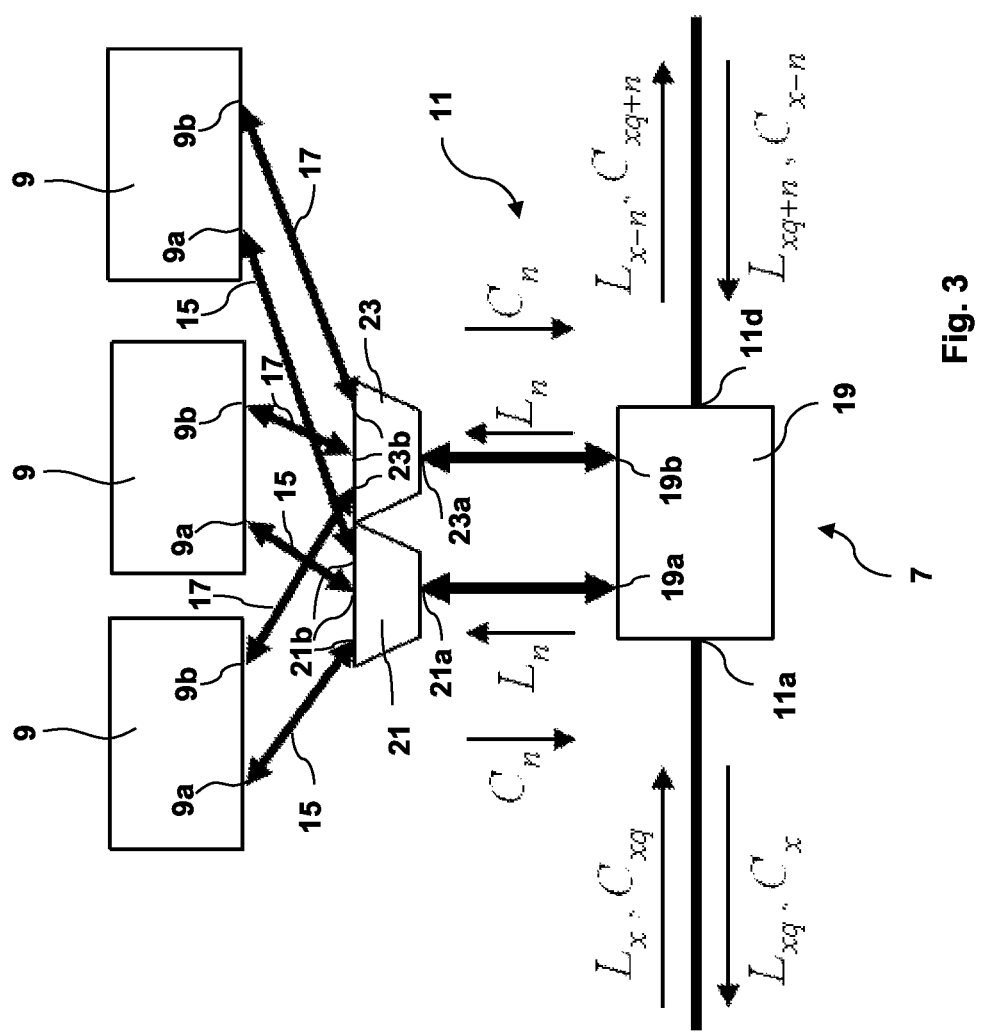
FIG. 3 shows a more detailed block diagram of a network node between the two head-end terminals including an optical add/drop filter device comprising an optical add/drop filter unit and two multiplexer/demultiplexer devices adapted to connect three tail-end terminals.

FIG. 3 shows a more detailed block diagram of a network node 7 that might be provided between the two head-end terminals 3, 5 in FIG. 1 or 2. The network node 7 includes an optical add/drop filter device 11 adapted to connect three tail-end terminals. The optical add/drop filter device 11 comprises an optical add/drop filter unit 19 and two multiplexer/demultiplexer devices 21, 23. The add/drop filter unit 19 defines the western and eastern WDM ports 11a, 11d of the add/drop filter device 11. Each of the multiplexer/demultiplexer devices 21, 23 has a WDM port 21a, 23a, respectively, that is connected, via an optical path, to a corresponding add/drop port 19a, 19b of the optical filter unit 19. Each of the three tail-end terminals 9 is connected to the first and second optical channel paths 15, 17, through the first and second channel port 9a, 9b, respectively. The respective other ends of the first and second optical channel paths 15, 17 are connected to a dedicated channel port 21b and 23b of the first and second multiplexer/demultiplexer device 21, 23, respectively. Each of the channel ports 21b defines a first channel port 11b of the add/drop filter device 11 and each of the channel ports 23b defines a second channel port 11c of the add/drop filter device 11 (see FIGS. 1 and 2), each pair of channel ports 21b, 23b (or 11b, 11c) being dedicated to a specific tail-end terminal 9.

FIG. 3 further indicates the signals as received and output at the WDM ports 11a, 11d and the add/drop ports 19a, 19b of the add/drop filter unit 19. At the western WDM port 11a of the add/drop filter unit 19, an optical WDM signal $L_x$ is received created by the first head-end terminal 3 and, if applicable, modified (i.e. selected channel signals may be fully extracted as explained below) by a further add/drop filter device provided upstream in the chain-like transmission path.

In general, the WDM signal received at the western WDM port of a predetermined optical add/drop filter device 11 may include all channel signals that are used for transmitting information to the tail-end terminals 9 connected to the network nodes 7, even if the respective received WDM signal has already been transmitted via other optical add/drop filter devices 11 provided upstream in the chain-like transmission path. This may be achieved if the optical add/drop filter devices 11 merely split the channel signals dedicated to the tail-end terminals 9 connected thereto so that all channel signals are present in the WDM signals output at the respective other WDM port 11d, 11a.

It is, however, preferred to design the add/drop filter devices 11 such that the optical channel signals of the optical channels dedicated to the at least one tail-end terminal 9 connected thereto are fully extracted from the optical WDM signal received at the western WDM port. Of course, the same applies to the optical WDM signal created by the second head-end terminal 5. The remaining channel signals (pass-through channel signals) are output at the respective other WDM port.

It is further preferred to use the identical optical channels of both the first and the second optical band for establishing the bidirectional communication between the first channel port 9a of a selected tail-end terminal 9 and the first head-end terminal 3 and for establishing the bidirectional communication between the second channel port 9b of the same tail-end terminal 9 and the second head-end terminal 5. These preferred properties may, of course, apply to all possible embodiments described above or below.

In the following description, the above-explained preferred measures are used for the design of the add/drop filter devices 11.

Referring again to the embodiment shown in FIG. 3, the index x of the optical WDM signal $L_x$ received at the western WDM port 11a of the add/drop filter device 11 indicates that the WDM signal $L_x$ includes a predetermined set of channel signals $L_i$ of a given full set of optical channels (with $1 \le i \le n$ and i being an integer number) which may be transported within the optical channels of the first optical band, e.g. the optical L band. The set of channel signals comprises all channel signals which are used for transmitting information from the first head-end terminal 3 to the tail-end terminals 9 connected to the respective add/drop filter device 11 and to all further tail-end terminals 9 connected to other add/drop filter devices located downstream (i.e. in the direction of the transmission of the WDM signal) in the chain-like optical transmission path. All channel signals of channels that are dedicated to tail-end terminals 9 connected to add/drop filter devices located upstream in the chain-like transmission path have already been fully extracted by the respective add/drop filter devices 9. All channel signals included in the WDM signal $L_x$ that are dedicated to one of the three tail-end terminals 9 connected to the respective add/drop filter device 11 in FIG. 3 are fully extracted by the add/drop filter unit 19 and output as a partial WDM signal $L_n$ at the add/drop port 19a. The multiplexer/demultiplexer unit 21 demultiplexes the partial channel signal $L_n$ into the single optical channel signals (if only a single optical channel is assigned to a respective tail-end terminal 9) or into sets of optical channel signals containing more than one optical channel signal (if more than one optical channel is assigned to a respective tail-end terminal 9), each single optical channel signal or set of optical channel signals being output at the respective optical channel port 21b of the multiplexer/demultiplexer device (which defines the respective optical channel port 11b of the add/drop filter device 11).

As, in the preferred embodiments, the optical channel signals $L_n$ are fully extracted from the optical WDM signals received at the western WDM port 11a, the add/drop filter unit 19 (or the respective add/drop filter device 11) outputs, at its eastern WDM port 11d, an optical WDM signal $L_{x-n}$, which does not include an optical channel signal $L_n$. As a result, no signal reflection can be produced (e.g. by Fresnel reflection or back-scattering) which would be added to the optical channel signal of the same optical channel used for the communication between the other (i.e. the second) head-end terminal 5 and same tail-end terminal 9.

Likewise, each tail-end terminal 9 creates an optical channel signal or a set of optical channel signals lying in the second optical wavelength band, e.g. the optical C band, which is supplied, via the respective channel port 9 and the optical path 15, to the respective channel port 21b of the multiplexer/demultiplexer device 21 (which defines the respective channel port 11b of the add/drop filter device). The optical channel signals $C_i$ used for transporting information from the tail-end terminals to the first head-end terminal 3 are taken from a given full set of optical channels (with $1 \leq i \leq n$ and i being an integer number) included in the second optical band, e.g. the optical C band. The multiplexer/demultiplexer device 21 multiplexes the optical channel signals or sets of channel signals received into a partial optical WDM signal $C_n$, which is output at the WDM port 21a and supplied to the first add/drop port 19a of the optical add/drop filter unit 19. The optical add/drop filter unit 19 integrates the partial WDM signal $C_n$ into an optical WDM signal $C_{x-n}$ received at the eastern WDM port 11d of the add/drop filter device (defined by the respective port of the add/drop filter unit 19). Of course, the WDM signal $C_{x-n}$ must not include an optical channel signal $C_n$ or a set of respective optical channel signals. However, as the optical channel signals $C_i$ are dedicated to a single tail-end terminal 9 (and thereby to a single respective add/drop filter device 11), it is guaranteed that the optical WDM signal received at the eastern WDM port 11d does not include optical channel signals in the optical channels which are used by the tail-end terminals 9 connected to the respective add/drop filter device 11 for communicating with the first head-end terminal 3.

The communication between the tail-end terminals 9 connected to the add/drop filter device 11 and the second head-end terminal 5 is effected in the same manner. Again, for the transmission between the second head-end terminal 5 and the tail-end terminals 9, dedicated optical channels lying in the first optical band are used, whereas for the transmission between the tail-end terminals 9 and the second head-end terminal 5 dedicated optical channels lying in the second optical band are used.

An optical WDM signal $L_{xq+n}$ that is received at the eastern WDM port 11d of the add/drop filter device 11 or the add/drop filter unit 19 includes all optical channel signals of the channels dedicated to the tail-end terminals 9 of the respective add/drop filter device 11 and to all other tail-end terminals connected to other add/drop filter devices 11 located downstream in the chain-like transmission path. The channel signal or set of channel signals $L_n$ is extracted from the WDM signal $L_{xq+n}$ and output at the second add/drop port 19b. The second multiplexer/demultiplexer 23 demultiplexes this partial WDM signal into the single channel signals or sets of channel signals of the channels or sets of channels dedicated to each of the tail-end terminals 9 and outputs these signals at the respective optical channel ports 23b of the multiplexer/demultiplexer 23 which define the respective optical channel ports 11b of the add/drop filter devices 11. The remaining channel signals included in the optical WDM signal are passed through and output as WDM signal $L_{xq}$ at the western WDM port 11a. In the reverse direction, i.e. in the direction to the second head-end terminal 5, the channel signals or sets of channel signals, which lie in the second optical band (e.g. the C band) and are output at the second channel port 9b of the tail-end terminals 9, are combined into a partial WDM signal $C_n$. This partial WDM signal $C_n$ is received at the second add/drop port 19b of the add/drop unit 19 and integrated into a WDM signal $L_{xq}$ received at the western WDM port 11a of the add/drop filter device 11. The combined WDM signal $L_{xq+n}$ including the channel signals created by the tail-end terminals 9 connected to the respective add/drop filter device 11 is output at the eastern WDM port 11d.

As apparent from the above description referring to embodiments which use identical channels in each of the two optical bands for the bidirectional communication over the working path and the protection path (i.e. in both directions of the chain-like transmission path), the WDM signals in the same band (e.g. the signals $L_x$ and $L_{xq}$ transmitted to and from the western WDM port of an add/drop filter device 11, the signals $C_x$ and $C_{xq}$ transmitted from and to the western WDM port of an add/drop filter device 11, the signals $L_{xq+n}$ and $L_{xq-n}$ transmitted to and from the eastern WDM port of an add/drop filter device 11 and the signals $C_{xq+n}$ and $C_{xq-n}$ transmitted from and to the eastern WDM port of an add/drop filter device 11) are at the maximum complementary signals, i.e. identical optical channels in both signals of a complementary signal pair do not simultaneously carry an optical channel signal. In other words, an optical fiber or optical path between two neighboring network nodes 7 or optical add/drop filter devices 11 does not guide optical channel signals of identical channels in opposite directions. As a result, even if reflections of an optical channel signal are created, these reflections cannot produce any impact on a wanted channel signal in the same optical channel that is guided in the opposite direction (i.e. the direction in which the reflected signal portion propagates).

As apparent from the above description, the multiplexers/demultiplexers 21, 23 are adapted to multilplex and demultiplex both the optical channel signals and optical WDM signals in both optical bands. Such multiplexers/demultiplexers may be realized by using cyclic optical multiplexer/demultiplexer devices, e.g. cyclically arrayed waveguide gratings. Of course, such multiplexers/demultiplexers may also be designed by using separate multiplexers/demultiplexers for each optical band wherein the WDM ports of the separate multiplexers/demultiplexers are combined by means of an optical diplexer and wherein for each pair of corresponding channel ports of the separate multiplexers/demultiplexers an optical diplexer is used for combining the optical channel signals (or sets of channel signals) to a single optical path between each of the entire first and second multiplexers/ demultiplexers 21, 23 and the respective tail-end terminal 9. The diplexers for combining the optical channel ports of the separate multiplexers/demultiplexers (each handling the channel signals in one of the two optical bands) may also be integrated in the tail-end terminals 9, if two optical paths (especially optical fibers) are acceptable between the separate multiplexers/demultiplexers and the tail-end terminals (e.g. if the multiplexers/demultiplexers 21, 23 and the respective tail-end terminal 9 are provided at the same location).

Although FIG. 3 shows a specific embodiment of an optical add/drop filter device 11 connecting three tail-end terminals 9, this principle may, of course, also be applied to any arbitrary number of tail-end terminals.

The add/drop filter unit 19 and the multiplexers/demultiplexers 21, 23 may be provided at the same or at different locations as each of the multiplexers/demultiplexers 21, 23 is connected to the add/drop filter unit 19 by a single optical path, e.g. an optical fiber, only. Likewise, each of the tail-end terminals 9 may be provided at the same location as one or both of the multiplexers/demultiplexers 21, 23. As each tail-end terminal 9 is connected, with its first and second channel port 9a, 9b, to the respective first and second channel ports of the add/drop filter device 11 (defined by the respective channel ports 21b and 23b of the multiplexers/demultiplexers 21, 23), a full path protection for the communication between each tail-end terminal 9 and the first or second head-end terminal 3, 5 is achieved.

Of course, if only a single tail-end terminal is connected to an add/drop filter device 1 (as shown by way of example in the embodiments of FIGS. 1 and 2), the multiplexer/demultiplexer units 21, 23 are obsolete and the add/drop filter device 11 may consist of the add/drop filter unit, only. Also in this case, the partial WDM signal $L_n$ may still include more than one optical channel signal $L_i$, wherein the respective tail-end terminal 9 is adapted to receive and demultiplex the partial channel signal $L_n$ and to detect and opto-electrically convert the single channel signals into respective electrical channel signals which may be further processed. However, in many cases the tail-end terminals will be adapted to receive and transmit a single optical channel signal $L_i$, only.

Figure 4:
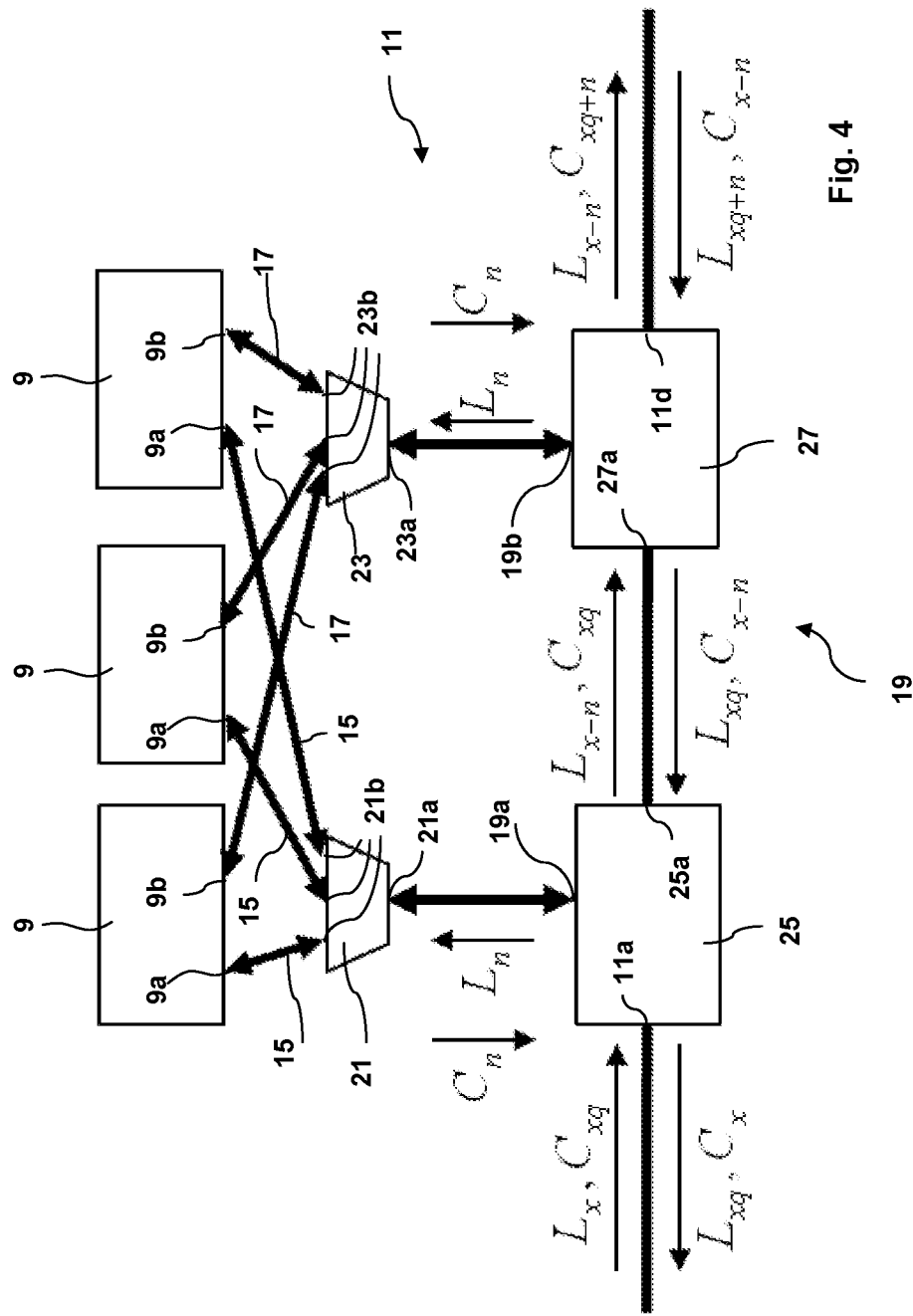
FIG. 4 shows a more detailed block diagram of a network node similar to FIG. 3 with an optical add/drop filter device comprising an optical add/drop filter unit consisting of a first and a second optical add/drop filter module, each optical add/drop filter module being connected to one of the two multiplexer/demultiplexer devices.

FIG. 4 shows a schematic block diagram of a further embodiment of a network node 7 which is connected to three tail-end terminals 9, similar to the embodiment shown in FIG. 3. Thus, for the general function, reference is made to the above description.

The embodiment in FIG. 4 differs from the embodiment in FIG. 3 in that the add/drop filter unit 19 is separated into a first and a second add/drop filter module 25, 27. The first add/drop filter module 25 is configured to extract the optical channel signals (i.e. the partial WDM signal, as more than one optical channel signal is extracted) $L_n$ from the WDM signal $L_x$ received at the western WDM port 11a, which is defined by a respective WDM port of the first add/drop filter module 25. Further, the first add/drop filter module 25 is configured to integrate the optical channel signals (i.e. the partial WDM signal as more than one optical channel signal is received from the tail-end terminals 9) $C_n$ into the WDM signal $C_{x-n}$ received at an eastern WDM port 25a of the first add/drop filter module 25, which is connected to a western WDM port 27a of the second add/drop filter modules 27. The optical path between the western WDM port 27a and the eastern WDM port 25a guides the optical channel signals that are passed through (in both directions) by the add/drop filter unit 19. That is, the add/drop filter module 25 is used for establishing bidirectional communication links between each of the tail-end terminals 9 and the first head-end terminal 3.

Likewise, the second add/drop filter module 27 is used for establishing bidirectional communication links between each of the tail-end terminals 9 and the second head-end terminal 5. It is configured to extract the optical channel signals $L_n$ from the WDM signal $L_{xq+n}$ received at the eastern WDM port 11d, which is defined by a respective WDM port of the second add/drop filter module 27. The second add/drop filter module 27 is further configured to integrate the optical channel signals $C_n$ into the WDM signal $C_{xq}$ received at the western WDM port 27a.

Of course, the optical path between the WDM ports 25a and 27a of the add/drop filter modules 25, 27 may be realized by an optical fiber of arbitrary length so that the filter modules 25, 27 may be provided remote from each other. This increases the flexibility in designing a desired network structure using the structure of an add/drop filter device shown in FIG. 4.

Figure 5:
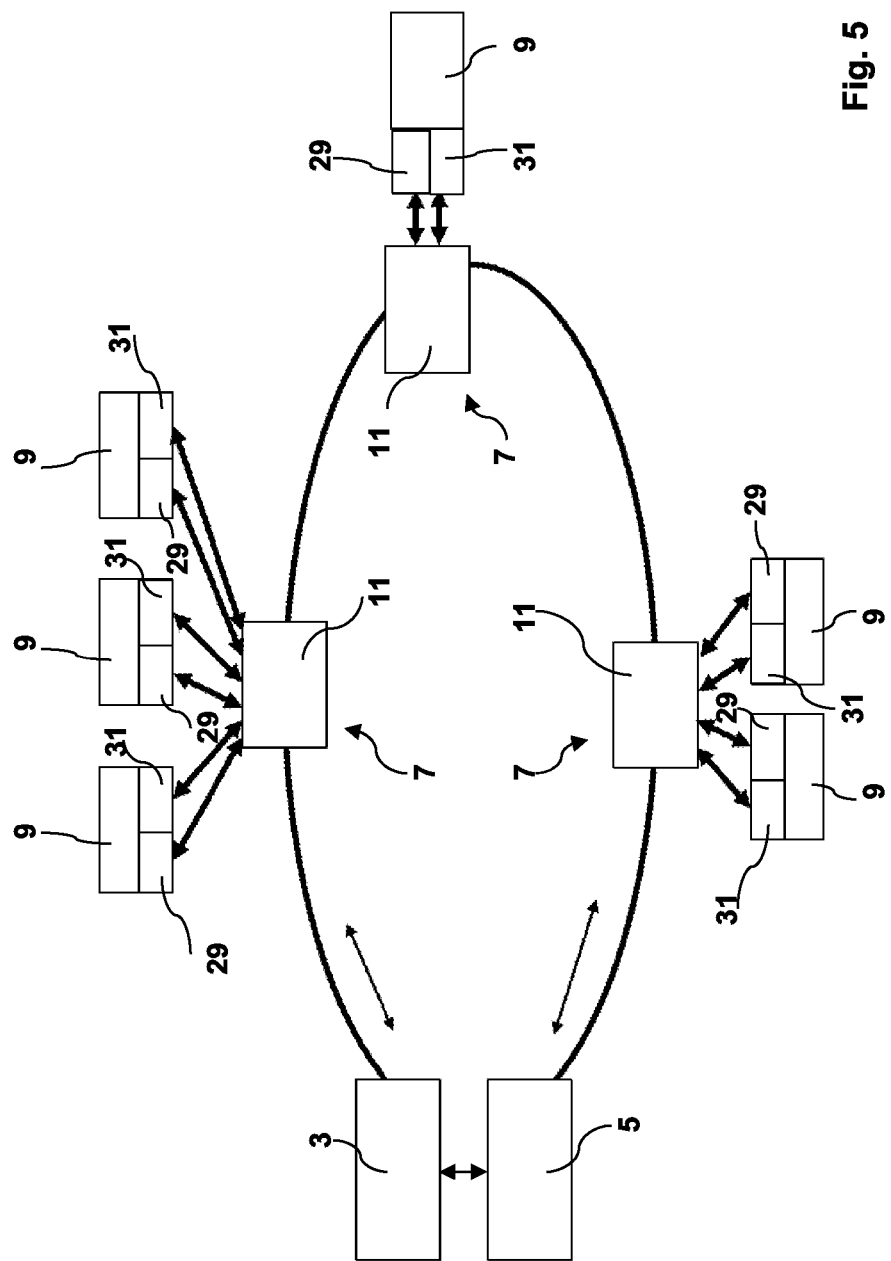
FIG. 5 shows a schematic block diagram similar to FIG. 1, each of the optical add/drop filter devices connecting one, two or three head-end terminals.
Figure 6:
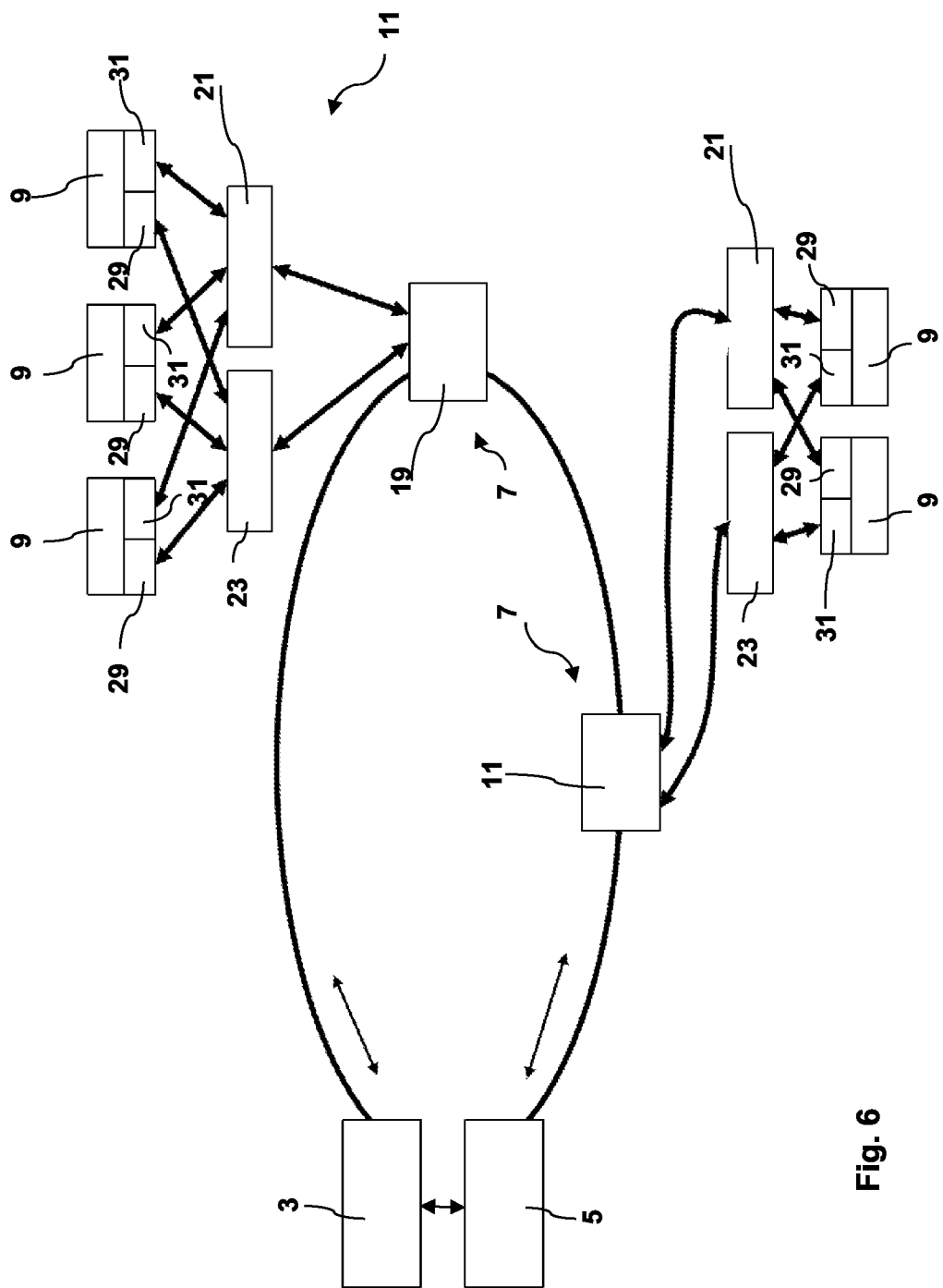
FIG. 6 shows a schematic block diagram similar to FIG. 5, the optical single-fiber WDM system having two network nodes for connecting two or three tail-end terminals, respectively, with each of the optical add/drop filter devices comprising an optical add/drop filter unit and a multiplexer/demultiplexer device that is located remotely from the respective optical add/drop filter unit.
Figure 7:
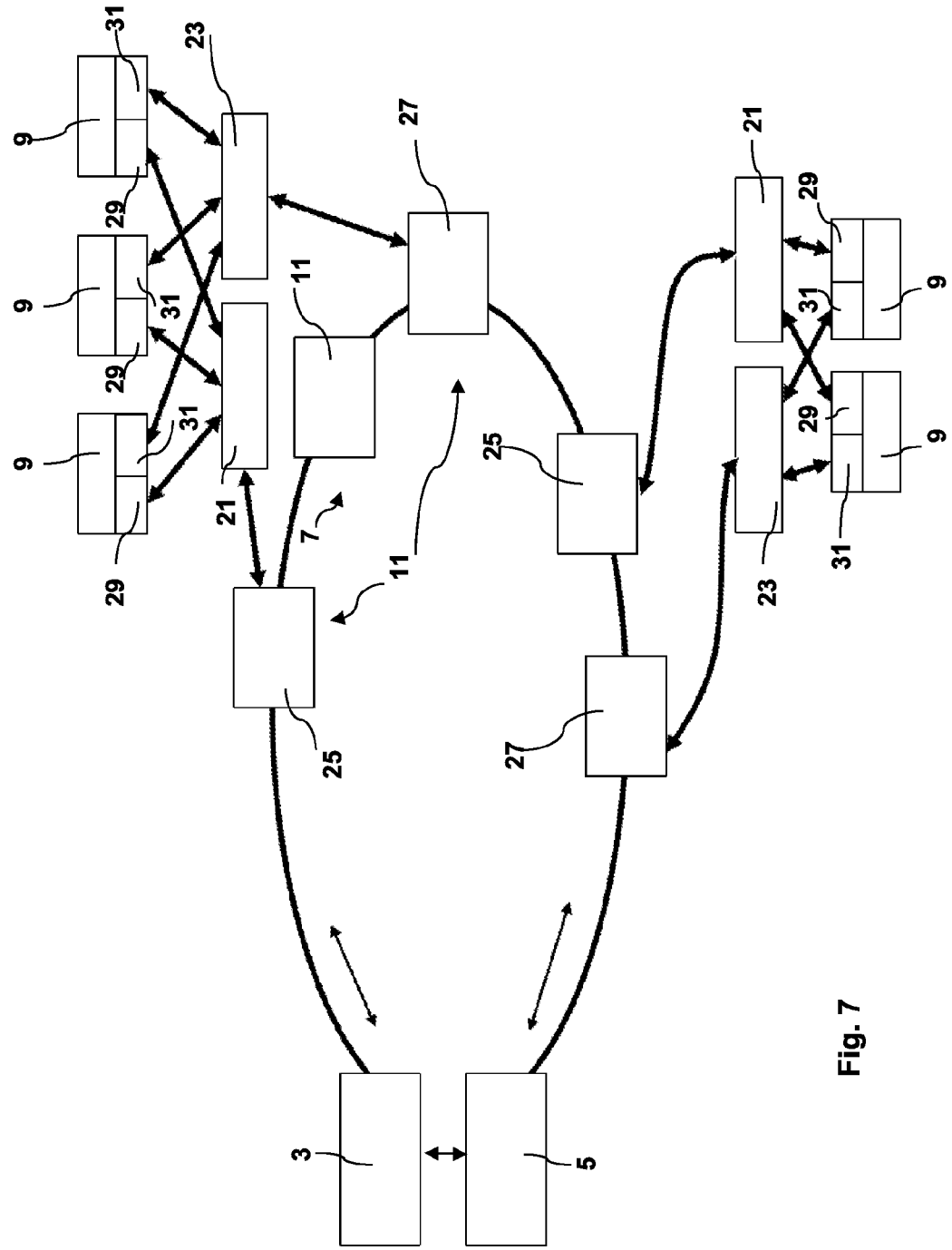
FIG. 7 shows a schematic block diagram similar to FIG. 6, wherein each of the two network nodes in FIG. 6 comprises an optical add/drop filter unit consisting of two separate optical add/drop filter modules and wherein a further network node is provided between the add/drop modules of one of the network nodes.

FIGS. 5 to 7 show examples of embodiments of different structures of the network nodes 7 or add/drop filter devices 11, respectively.

FIG. 5 shows an example of a network structure of a single-fiber WDM system comprising three network nodes 7 which consist of an add/drop filter device 11 adapted to connect one, two or three tail-end terminals 9. The chain-like path reveals the open ring structure according to FIG. 1. Each of the add/drop filter devices 11 may be realized according to the embodiments shown in FIG. 3. Of course, the structure of an add/drop filter device shown in FIG. 4 might also be used if a separation of the respective add/drop filter units 19 into two add/drop filter modules 25, 27 is desirable or advantageous. In this embodiment, the add/drop filter devices 11 are provided at the same location. The add/drop filter device 11 which connects a single tail-end terminal 9 may, of course, consist of an add/drop filter unit 19, only, as no multiplexer/demultiplexer is necessary for separating and combining the optical channel signals directed to or received from a plurality of tail-end terminals.

The embodiment according to FIG. 6 comprises two network nodes 7 realized by add/drop filter devices 11, wherein the add/drop filter devices 11 reveal a structure according to FIG. 3, i.e. the add/drop filter device 11 comprises an add/drop filter unit 19 and two multiplexers/demultiplexers 21, 23.

FIG. 7 shows almost the same embodiment as FIG. 6. However, the add/drop filter units 19 are realized by separate add/drop filter modules according to FIG. 4. This makes it possible to provide the add/drop filter modules 25, 27 at different locations. Even a further network node 7 may be present between two add/drop filter modules 25, 27 as shown in FIG. 7 with respect to the distributed network node 7 or add/drop filter device 11 neighboring the first head-end terminal 3.

The tail-end terminals 9 in FIGS. 5 to 7 comprise separate transceiver units 29, 31 for each of the two communication directions. In this way, equipment protection is provided on the tail-end side.

Figure 8:
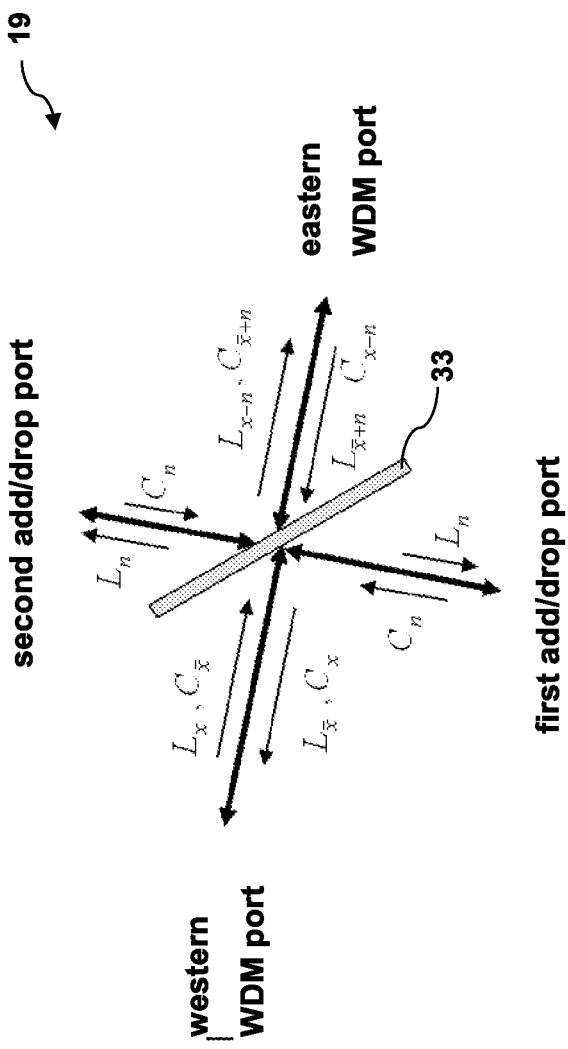
FIG. 8 shows a schematic representation of an optical add/drop filter unit defining the two add/drop ports, the optical add/drop filter unit comprising a single optical filter element for dropping and adding the optical channel signals dedicated to the respective network node.

FIG. 8 shows the add, drop and transit wavelength sets of an add/drop filter unit 19, when a single add/drop filter element 33 is used, which is adapted to transmit all optical channel signals but the channel signals included in the optical channels that are dedicated to the tail-end terminals connected to the respective add/drop filter unit 19, namely, the partial optical WDM signals $L_n$ and $C_n$ (which may also comprise a single optical channel signal, only). In this embodiment, the add/drop filter element 33 may be realized as cyclic optical filter element adapted to reflect the desired channel signals in both optical bands.

Figure 9:
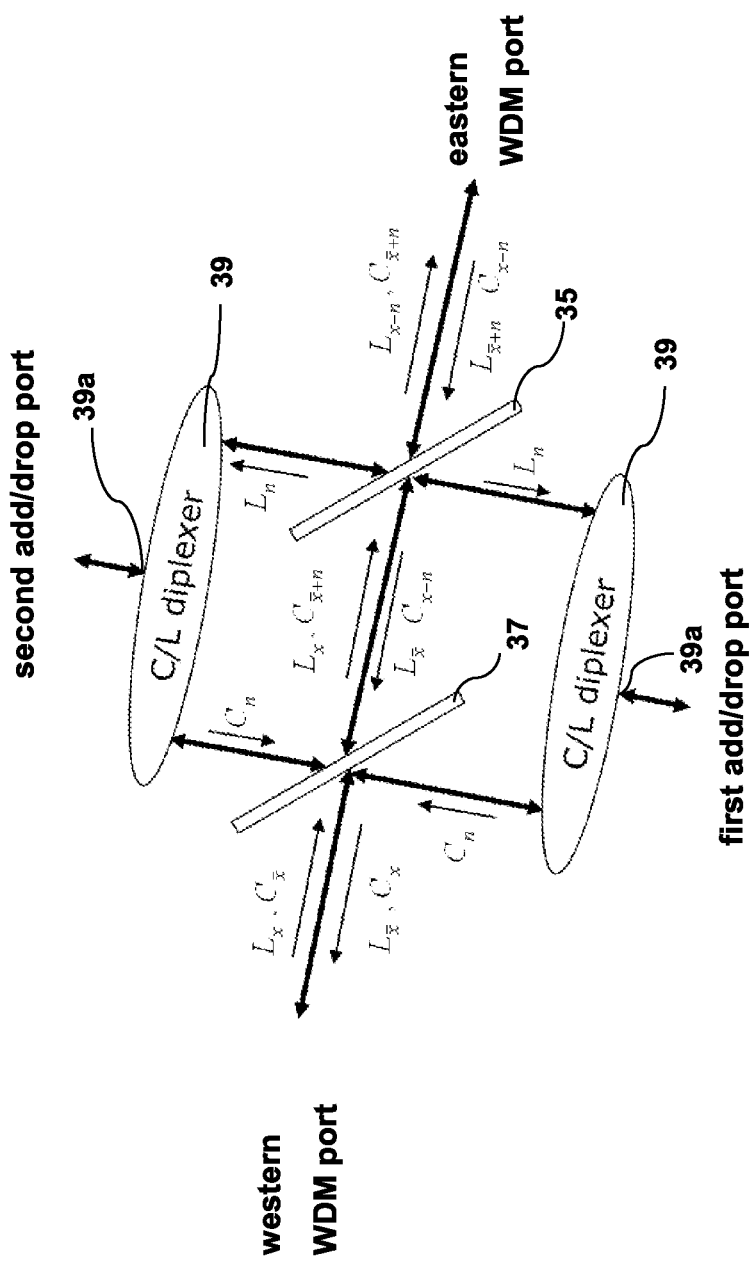
FIG. 9 shows a schematic representation of an optical add/drop filter unit defining the two add/drop ports, the optical add/drop filter unit comprising two optical filter elements for dropping and adding the optical channel signals dedicated to the respective network node.

FIG. 9 shows the add, drop and transit wavelength sets of an add/drop filter unit 19, when two distinct (and potentially separate) add/drop filter elements 35, 37 are used, wherein the filter element 35 is adapted to transmit all optical channel signals but the channel signals included in the optical channels of the first optical band that are dedicated to the tail-end terminals connected to the respective add/drop filter unit 19, and the filter element 37 is adapted to transmit all optical channel signals but the channel signals included in the optical channels of the second optical band that are dedicated to the tail-end terminals connected to the respective add/drop filter unit 19. All other channel signals are transmitted through the respective filter elements 35, 37.

Figure 10:
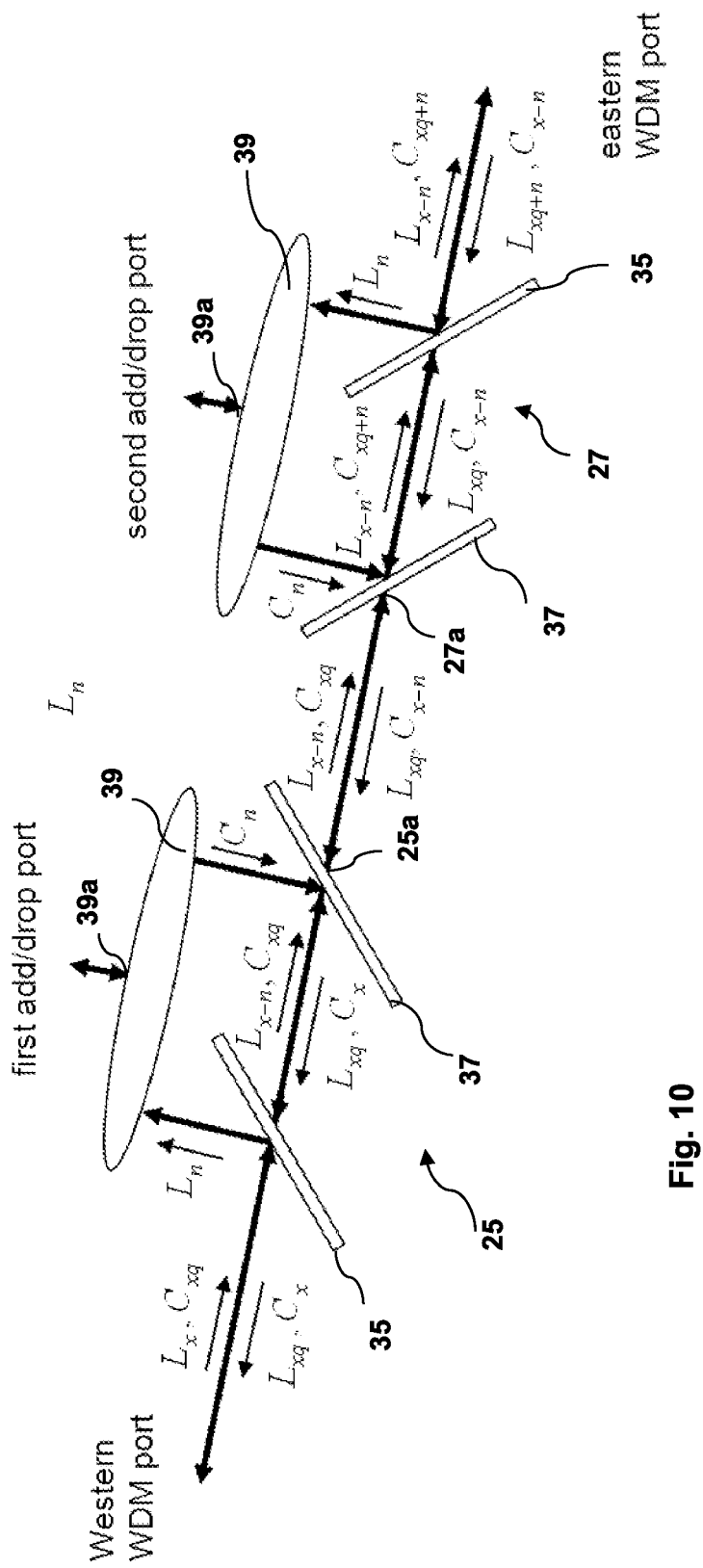
FIG. 10 shows a schematic representation of an optical add/drop filter unit for realizing to optical add/drop filter modules, each optical add/drop filter module defining an add/drop port and comprising two optical filter elements for dropping and adding the optical channel signals dedicated to the respective network node.

FIG. 10 shows a further embodiment of a filter structure suitable to realize an optical add/drop filter unit 19 consisting of two add/drop filter modules 25, 27. Here again, each add/drop filter module 25, 27 is realized by two distinct and potentially separate add/drop filter elements 35, 37 having the properties as explained with respect to the embodiment according to FIG. 9. The optical channel signals which are passed through each of the modules 25, 27 are output at the eastern WDM port of module 25 and the western WDM port of module 27, respectively. Of course, instead of the two separate add/drop filter elements 35, 37, a single filter element 33 having the properties explained above in connection with FIG. 8 might be used in order to realize the structure of FIG. 10.

Concerning the designation and function of the optical channel signals or wavelength sets shown in FIGS. 8, 9 and 10, reference is made to the above description of the embodiment according to FIGS. 3 and 4. It is again emphasized that the wavelength sets travelling on a single fiber in different directions are complementary, which reduces signal distortions due to reflections or backscattering.

The add/drop ports of the add/drop filter units 19 according to FIGS. 9 and 10 realized by distinct and separate add/drop filter elements 35 and 37 are defined by a WDM port 39a of a respective optical diplexer 39. Alternatively, an optical circulator can be used for combining/separating the two optical paths.

The filter elements 35 and 37 may be produced for example in thin-film technology. This technology is also suitable to realize an add/drop filter 33 reflecting the desired optical channel signal in both optical bands. This reduces the insertion loss for the pass-through channel signals. If filter elements 33 adapted to add/drop the desired channels in both wavelength bands are not available or too costly, a dual-filter structure as shown in FIGS. 9 and 10 can be used.

Figure 11:
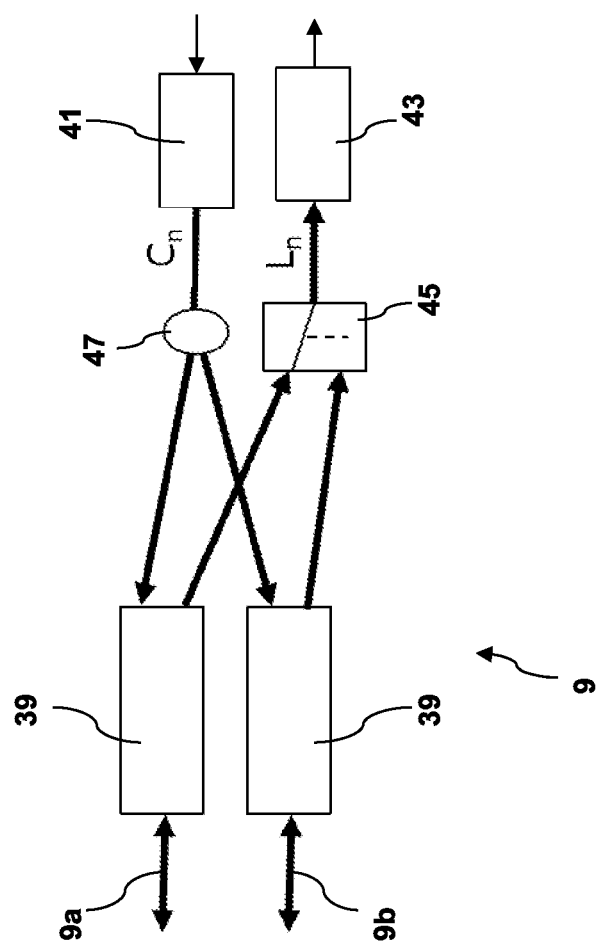
FIG. 11 shows a schematic block diagram of a tail-end terminal comprising an optical receiver connected to an optical 2×1 switch and an optical transmitter connected to an optical splitter, each of the two splitter output ports and each of the two switch input ports being connected to a first and second optical diplexer defining the respective channel ports.

FIG. 11 shows a schematic block diagram of a tail-end terminal 9 which comprises, instead of using two separate transceiver units 29, 31 per optical channel, providing equipment protection, an optical receiver unit 43 connected to an optical 2×1 switch 45 and an optical transmitter unit 41 connected to an optical splitter 47, each of the two splitter output ports and each of the two switch input ports being connected to a first and second optical diplexer 39 defining the respective channel ports 9a, 9b. The optical 2×1 switch is controlled by a control unit of the tail-end terminal 9 (not shown) so as to switch from the working path to the protection path or vice versa. A structure using an optical switch to select the received signal and a power coupler to split the transmitted signal between both directions can be used at any or all tail-end locations (see FIG. 8).

As used herein, whether in the above description or the following claims, the terms "comprising," "including," "carrying," "having," "containing," "involving," and the like are to be understood to be open-ended, that is, to mean including but not limited to.

The above described preferred embodiments are intended to illustrate the principles of the invention, but not to limit the scope of the invention. Various other embodiments and modifications to these preferred embodiments may be made by those skilled in the art without departing from the scope of the present invention.

LIST OF REFERENCE NUMERALS 1, 1' optical single fiber WDM system
3 first head-end terminal
3a WDM port
5 second head-end terminal
5a WDM port
7 network node
9 tail-end terminal
9a first channel port
9b second channel port
11 add/drop filter device
11a western WDM port
11b first channel port
11c second channel port
11d eastern WDM port
13 optical fiber
15 first optical channel path
17 second optical channel path
19 optical add/drop filter unit
19a first add/drop port
19b second add/drop port
21 multiplexer/demultiplexer device
21a WDM port
23 multiplexer/demultiplexer device 23a WDM port
25 first add/drop filter module
25a eastern WDM port
27 second add/drop filter module
27a western WDM port
29, 31 transceiver unit
33 add/drop filter element (both bands)
35 add/drop filter element (first band)
37 add/drop filter element (second band)
39 optical diplexer
39a WDM port
41 optical transmitter unit
43 optical receiver unit
45 optical 2×1 switch
47 optical splitter

The invention claimed is:

1. A protected optical single-fiber WDM system, comprising:
(a) a first head end terminal and a second head-end terminal and at least one optical add/drop filter device connected to form a chain-like transmission path, each of the first and second head-end terminals being connected, at a WDM port, through a single optical fiber to a western or an eastern WDM port of an adjacent one of the optical add/drop filter devices, respectively, and each of the optical add/drop filter devices being connected, at an eastern or western WDM port, to a western or eastern WDM port of an adjacent one of the optical add/drop filter devices, respectively,
(b) at least one tail-end terminal connected to each optical add/drop filter device, wherein a first and a second channel port of the respective tail-end terminal is connected to a dedicated first and second channel port of the optical add/drop filter device through a respective optical fiber, and (c) wherein the head-end terminals, the optical add/drop filter devices and the tail-end terminals are adapted to selectively or simultaneously establish a bidirectional communication between each tail-end terminal and the first and second head-end terminal, wherein each tail-end terminal bidirectionally communicates through its first channel port with the first head-end terminal and bidirectionally communicates through its second channel port with the second head-end terminal, one of these communication paths serving as a working communication path and the other of these communication paths serving as a protection path, (d) wherein for the communication between each of the tail-end terminals and the first and second head-end terminal, respectively, dedicated optical channel signals lying in a first wavelength band and a second wavelength band are used for each transmission direction, the first and second wavelength band having no overlap and the optical channel signals in each wavelength band forming, in each transmission direction in the chain-like transmission path, respective optical WDM signals, wherein at least one dedicated optical channel signal selected from a first set of predetermined optical channels lying in the first wavelength band is used for the transmission direction from the first or second head-end terminal to each of the tail-end terminals, and at least one dedicated optical channel signal selected from a second set of predetermined optical channels lying in the second wavelength band is used for the transmission direction from each of the tail-end terminals to the first or second head-end terminal.

2. The system of claim 1, wherein at least two optical add/drop filter devices are provided and that each of the optical add/drop filter devices is adapted (a) to drop from the respective optical WDM signal received at the western WDM port, at the respective first channel port the optical channel signal dedicated to the respective tail-end terminal and to add the optical channel signal received from the first channel port a of the respective tail-end terminal to the optical WDM signal that is transmitted to the first head-end terminal via the western WDM port, and (b) to drop from the respective optical WDM signal received at the eastern WDM port, at the respective second channel port, the optical channel signal dedicated to the respective tail-end terminal and to add the optical channel signal received from the second channel port of the respective tail-end terminal to the optical WDM signal that is transmitted to the second head-end terminal via the eastern WDM port, (c) wherein the optical channel signals dropped at the respective optical add/drop filter device are extracted from the respective optical WDM signal received and are no longer transmitted further in the chain-like transmission path.

3. The system of claim 2, wherein at least one of the optical add/drop filter devices comprises an optical add/drop filter unit configured (a) to output, at a first add/drop port, all optical channel signals to be dropped at the respective optical add/drop filter device from the optical WDM signal received at the western WDM port, (b) to receive, at the first add/drop port, an optical WDM signal comprising all optical channel signals received from the at least two tail-end terminals and to integrate these optical channel signals into the optical WDM signal output at the western WDM port, (c) to output, at a second add/drop port, all optical channel signals to be dropped at the respective optical add/drop filter device from the optical WDM signal received at the eastern WDM port, and (d) to receive, at the second add/drop port, an optical WDM signal comprising all optical channel signals received from the at least two tail-end terminals and to integrate these optical channel signals into the optical WDM signal output at the eastern WDM port.

4. The system of claim 3, characterized in that the optical add/drop filter unit is adapted to be connected to a single tail-end terminal, the first and second add/drop ports defining the first and second channel ports.

5. The system of claim 4, characterized in that the optical add/drop filter unit is adapted to add a single optical channel signal to the optical WDM signals output at the western and eastern WDM port, respectively, and to drop a single optical channel signal from the optical WDM signals received at the western and eastern WDM port, respectively.

6. The system of claim 3, characterized in that the optical add/drop filter device is adapted to be connected to at least two tail-end terminals, the optical add/drop filter device comprising a first and a second optical multiplexer/demultiplexer device, (a) the first optical multiplexer/demultiplexer device being connected with a WDM port to the first add/drop port of the optical add/drop filter unit, the first optical multiplexer/demultiplexer device having channel ports defining the first channel ports of the optical add/drop filter device, the first optical multiplexer/demultiplexer device being adapted to demultiplex the optical WDM signal received at its WDM port into the optical channel signals and to output the optical channel signals at the dedicated first channel ports, and to multiplex the optical channel signals received at the first channel ports into the optical WDM signal output at its WDM port, and (b) the second optical multiplexer/demultiplexer device being connected with a WDM port to the second add/drop port of the optical add/drop filter unit, the second optical multiplexer/demultiplexer device having channel ports defining the second channel ports of the optical add/drop filter device, the second optical multiplexer/demultiplexer device being adapted to demultiplex the optical WDM signal received at its WDM port into the optical channel signals and to output the optical channel signals at the second channel ports, and to multiplex the optical channel signals received at the second channel ports into the optical WDM signal output at its WDM port.

7. The system of claim 6, in which the optical add/drop filter unit and the first and second optical multiplexer/demultiplexer devices are provided at different locations, the first and second add/drop ports of the add/drop filter unit preferably being connected to the respective WDM port of the respective first and second optical multiplexer/demultiplexer device through an optical fiber.

8. The system of claim 3, in which the optical add/drop filter unit comprises (a) a first add/drop filter module having a western and an eastern WDM port, the western WDM port defining the western WDM port of the optical add/drop filter device and the eastern WDM port defining an eastern pass-through port, and an add/drop port defining the first add/drop port of the optical add/drop filter unit, and (b) a second add/drop filter module having a western and an eastern WDM port, the eastern WDM port defining the eastern WDM port of the optical add/drop filter device and the western WDM port defining a western pass-through port, and an add/drop port defining the second add/drop port of the optical add/drop filter unit, (c) wherein the first and second add/drop filter modules are connected at the eastern and western pass-through ports.

9. The system of claim 8, in which the first and second add/drop filter modules are provided at different locations, the pass-through ports being connected through an optical fiber.

10. A protected optical single-fiber WDM system comprising:

(a) a first head end terminal and a second head-end terminal and at least one optical add/drop filter device connected to form a chain-like transmission path, each of the first and second head-end terminals being connected, at a WDM port, through a single optical fiber to a western or an eastern WDM port of an adjacent one of the optical add/drop filter devices, respectively, and each of the optical add/drop filter devices being connected, at an eastern or western WDM port, to a western or eastern WDM port of an adjacent one of the optical add/drop filter devices, respectively, (b) at least one tail-end terminal connected to each optical add/drop filter device, wherein a first and a second channel port of the respective add/drop tail-end terminal is connected to a dedicated first and second channel port of the optical add/drop filter device through a respective optical fiber, and (c) wherein the head-end terminals, the optical add/drop filter devices and the tail-end terminals are adapted to selectively or simultaneously establish a bidirectional communication between each tail-end terminal and the first and second head-end terminal, wherein each tail-end terminal bidirectionally communicates through its first channel port with the first head-end terminal and bidirectionally communicates through its second channel port with the second head-end terminal, one of these communication paths serving as a working communication path and the other of these communication paths serving as a protection path, (d) wherein for the communication between each of the tail-end terminals and the first and second head-end terminal, respectively, dedicated optical channel signals lying in a first wavelength band and a second wavelength band are used for each transmission direction, the first and second wavelength band revealing no overlap and the optical channel signals in each wavelength band forming, in each transmission direction in the chain-like transmission path, respective optical WDM signals, wherein at least one dedicated optical channel signal selected from a first set of predetermined optical channels lying in the first wavelength band is used for the transmission direction from the first or second head-end terminal to each of the tail-end terminals, and at least one dedicated optical channel signal selected from a second set of predetermined optical channels lying in the second wavelength band is used for the transmission direction from each of the tail-end terminals to the first or second head-end terminal;

(e) wherein at least one of the optical add/drop filter devices comprises an optical add/drop filter unit configured (i) to output, at a first add/drop port, all optical channel signals to be dropped at the respective optical add/drop filter device from the optical WDM signal received at the western WDM port, (ii) to receive, at the first add/drop port, an optical WDM signal comprising all optical channel signals received from the at least two tail-end terminals and to integrate these optical channel signals into the optical WDM signal output at the western WDM port, (iii) to output, at a second add/drop port, all optical channel signals to be dropped at the respective optical add/drop filter device from the optical WDM signal received at the eastern WDM port, and (iv) to receive, at the second add/drop port, an optical WDM signal comprising all optical channel signals received from the at least two tail-end terminals and to integrate these optical channel signals into the optical WDM signal output at the eastern WDM port;

(f) wherein the optical add/drop filter unit comprises (i) a first add/drop filter module having a western WDM port defining the western WDM port of the optical add/drop filter device and an eastern WDM port defining an eastern pass-through port, and an add/drop port defining the first add/drop port of the optical add/drop filter unit, and (ii) a second add/drop filter module having a western and an eastern WDM port, the eastern WDM port defining the eastern WDM port of the optical add/drop filter device and the western WDM port defining a western pass-through port, and an add/drop port defining the second add/drop port of the optical add/drop filter unit, (iii) and wherein the first and second add/drop filter modules are connected at the eastern and western pass-through ports;

(g) each of the optical add/drop filter modules includes a first and a second optical filter element provided in series within the optical path of the optical WDM signals between the western or eastern WDM port and the eastern or western pass-through ports of the respective optical add/drop filter module, (h) the first optical filter element is configured to reflect all optical channel signals to be dropped at the respective optical add/drop filter device and included in the optical WDM signal received at the western or eastern WDM port of the respective optical add/drop filter module, and to pass through all other optical channel signals, the reflected optical channel signals being directed in a respective direction to the first or second add/drop port defined by the respective optical add/drop filter module, and (i) the second optical filter element is configured to receive, via the first or second add/drop port defined by the respective optical add/drop filter module, all optical channel signals to be added at the respective add/drop module and to reflect these optical channel signals such that they are integrated into the WDM signal output at the western or eastern WDM port defined by the respective add/drop filter module and to pass through all other optical channel signals.

11. The system of claim 10, in which the first and second optical filter elements are realized by a single optical filter element which is adapted to reflect both the optical channel signals to be dropped and the optical channel signals to be added and to pass through all other channel signals.

12. A protected optical single-fiber WDM system comprising:

(a) a first head end terminal and a second head-end terminal and at least one optical add/drop filter device connected to form a chain-like transmission path, each of the first and second head-end terminals being connected, at a WDM port, through a single optical fiber to a western or an eastern WDM port of an adjacent one of the optical add/drop filter devices, respectively, and each of the optical add/drop filter devices being connected, at an eastern or western WDM port, to a western or eastern WDM port of an adjacent one of the optical add/drop filter devices, respectively;

(b) at least one tail-end terminal connected to each optical add/drop filter device, wherein a first and a second channel port of the respective add/drop tail-end terminal is connected to a dedicated first and second channel port of the optical add/drop filter device through a respective optical fiber;

(c) wherein the head-end terminals, the optical add/drop filter devices and the tail-end terminals are adapted to selectively or simultaneously establish a bidirectional communication between each tail-end terminal and the first and second head-end terminal, wherein each tail-end terminal bidirectionally communicates through its first channel port with the first head-end terminal and bidirectionally communicates through its second channel port with the second head-end terminal, one of these communication paths serving as a working communication path and the other of these communication paths serving as a protection path;

(d) wherein for the communication between each of the tail-end terminals and the first and second head-end terminal, respectively, dedicated optical channel signals lying in a first wavelength band and a second wavelength band are used for each transmission direction, the first and second wavelength band revealing no overlap and the optical channel signals in each wavelength band forming, in each transmission direction in the chain-like transmission path, respective optical WDM signals, wherein at least one dedicated optical channel signal selected from a first set of predetermined optical channels lying in the first wavelength band is used for the transmission direction from the first or second head-end terminal to each of the tail-end terminals, and at least one dedicated optical channel signal selected from a second set of predetermined optical channels lying in the second wavelength band is used for the transmission direction from each of the tail-end terminals to the first or second head-end terminal;

(e) wherein at least one of the optical add/drop filter devices comprises an optical add/drop filter unit configured (i) to output, at a first add/drop port, all optical channel signals to be dropped at the respective optical add/drop filter device from the optical WDM signal received at the western WDM port, (ii) to receive, at the first add/drop port, an optical WDM signal comprising all optical channel signals received from the at least two tail-end terminals and to integrate these optical channel signals into the optical WDM signal output at the western WDM port, (iii) to output, at a second add/drop port, all optical channel signals to be dropped at the respective optical add/drop filter device from the optical WDM signal received at the eastern WDM port, and (iv) to receive, at the second add/drop port, an optical WDM signal comprising all optical channel signals received from the at least two tail-end terminals and to integrate these optical channel signals into the optical WDM signal output at the eastern WDM port;

(f) wherein the optical add/drop filter unit includes a first and a second optical filter element provided in series within the optical path of the optical WDM signals between the western and eastern WDM port, (g) wherein the first optical filter element is adapted to reflect all optical channel signals to be dropped at the respective optical add/drop filter device and included in the optical WDM signals received at the western and eastern WDM ports of the optical add/drop filter unit and to pass through all other optical channel signals, (h) wherein the first optical filter element is further adapted and arranged to direct the reflected optical channel signals received from the western WDM port in a direction to the first add/drop port and to direct the reflected optical channel signals received from the eastern WDM port in a direction to the second add/drop port, (i) wherein the second optical filter element is adapted to reflect all optical channel signals to be added at the respective optical add/drop filter device via the first and second add/drop port of the optical add/drop filter unit and to pass through all other optical channel signals, and (j) wherein the second optical filter element is further adapted and arranged to direct the reflected optical channel signals received via the first add/drop port to the western WDM port and to direct the reflected optical channel signals received via the second add/drop port to the eastern WDM port.

13. The system of claim 12, in which the first and second optical filter elements are realized by a single optical filter element which is adapted to reflect both the optical channel signals to be dropped and the optical channel signals to be added and to pass through all other channel signals.

14. The system of claim 12 or 13, in which an optical add/drop filter unit or an optical add/drop filter module, respectively, includes, for each transmission direction, an optical diplexer having a WDM port defining the first or second add/drop port adapted to output all the optical channel signals to be dropped and to receive all the optical channel signals to be added at the respective optical add/drop filter unit, the optical diplexer having further a first band port adapted to receive the optical channel signals reflected in the direction of the first add/drop port and a second band port adapted to output the optical channel signals to be reflected and integrated into the respective WDM signal.

15. The system of claim 1, in which:

(a) that the first and second head-end terminal and the at least one tail-end terminal are adapted to simultaneously transmit the respective optical channel signals for establishing a bidirectional communication between the first and second head-end terminal and the at least one tail-end terminal via the communication path and the protection path and to select one of the respective channel signals received via either the working path or the protection path for communicating with each other, or (b) that the first and second head-end terminal and the at least one tail-end terminal are adapted to selectively transmit the respective optical channel signals for establishing a bidirectional communication between the first and second head-end terminal and the at least one tail-end terminal either via the communication path or via the protection path and switch to transmitting the respective optical signals via the respective other path if a loss of signal or an inadmissible deterioration of a parameter depending on or characterizing a respective signal quality is detected.

* * * * *